DUAL FOCAL PLANE MICROSCOPE

Filed Sept. 12, 1966

INVENTOR.
JAMES J. DOHERTY,
BY [signature] &
[signature]
ATTORNEYS.

United States Patent Office 3,488,104

Patented Jan. 6, 1970

3,488,104

DUAL FOCAL PLANE MICROSCOPE

James J. Doherty, Menlo Park, Calif., assignor to Fairchild Camera and Instrument Corporation, Long Island City, N.Y., a corporation of Delaware Filed Sept. 12, 1966, Ser. No. 578,632

Int. Cl. G02b *7/00, 21/18, 21/00*

U.S. Cl. 350—81 6 Claims

ABSTRACT OF THE DISCLOSURE

Images produced by a microscope of two objects located in two different object planes are superimposed in one image plane by equalizing both the optical paths between the two object planes and the image plane and the magnification of the two objects.

Figures 1, 2:
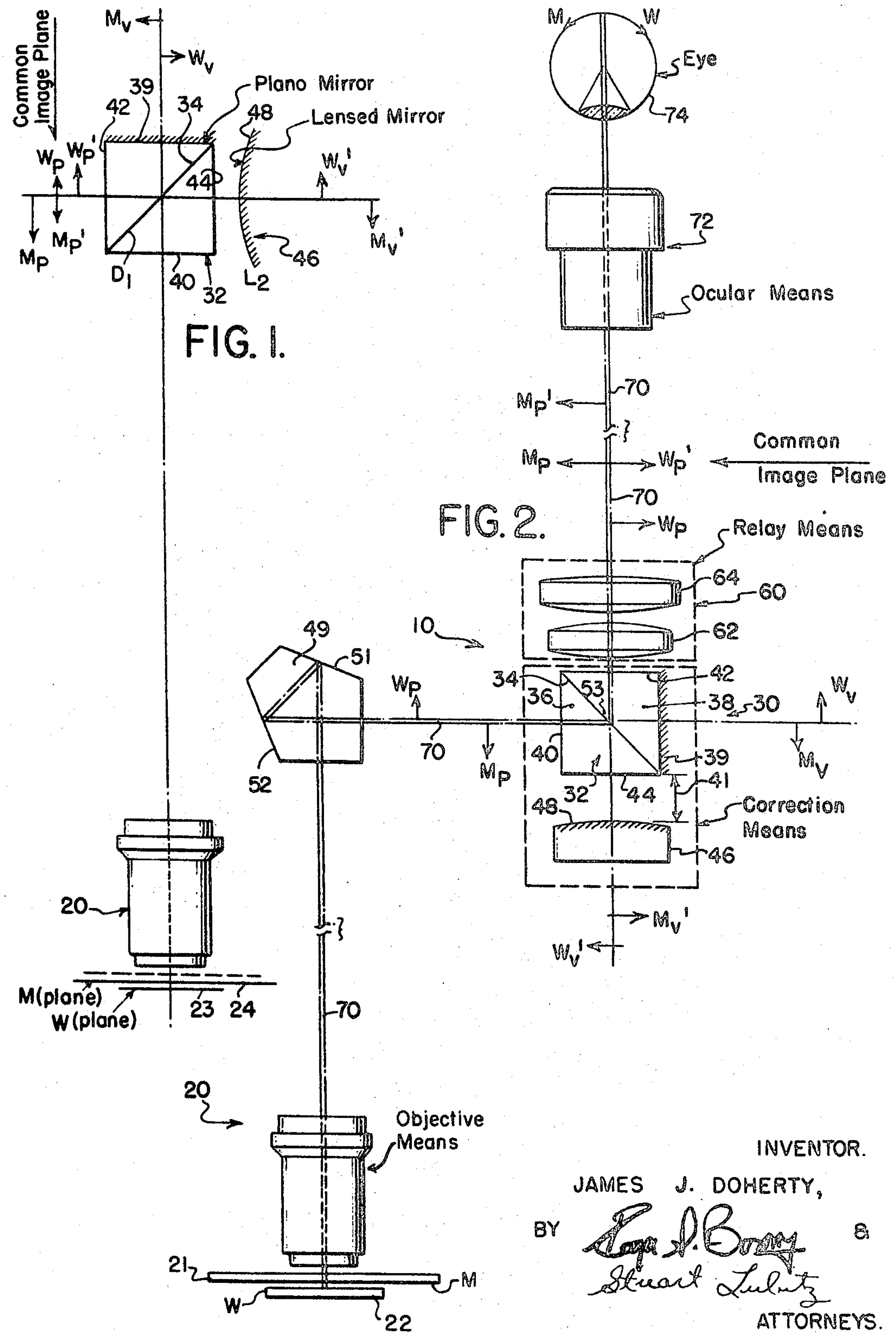

This invention relates to an optical system for viewing two objects at high magnification simultaneously while separated by a given distance. In particular, the invention relates to a microscope for viewing two objects located along its optical axis in close proximity to one another.

In accordance with modern technology, there has been a trend toward micro-miniaturization. This tread has been especially pronounced in the electronic arts and, in particular, the semiconductor arts. In the electronic art, the components employed have for the last 20 years progressed from tubes to transistors to integrated circuits. With regard to transistors and integrated circuits, it is common for the fabrication and checking of such devices to be accomplished with the help of a microscope. Such devices often are formed from a semiconductor wafer which may include a plurality of elements. The elements may be joined together to form a circuit or the wafer may be cut to form a plurality of elements. In either event at some point in the fabrication, the wafer or part thereof is viewed under a microscope and a transparent member or mask with a pattern or opaque and transparent portions is aligned over the wafer in order to superimpose the configuration of the various elements formed therein.

At one point in the state of the art, the wafer and the elements formed therein were of such size that it was completely adequate to employ a microscope with a low numerical aperture objective and sufficient depth of focus to view both the wafer and the axially separated transparent member simultaneously and perform any corrections, testing, alignment or other operations. As the geometry of the objects formed on the mask and wafer have been reduced in size, this procedure became obsolete because the depth of focus of the objective required to resolve these very small objects simultaneously became much smaller than the minimum safe separation of the transparent member and wafer for aligning and positioning in the optical alignment system. To avoid this, one approach has been to place the transparent member and wafer in contact and focus on the single plane where contact is made. Then, after noting mis-alignment with the transparent member and wafer in contact, the two are separated and adjustment is carried out in a blind fashion. This procedure is repeated several times until some acceptable degree of alignment is accomplished and the wafer may be checked or otherwise operated upon. This is a time consuming, tedious and inefficient method.

Another approach to solving the problem has been to view alternately the transparent member and wafer with a special microscope designed to focus on one and then the other object is rapid succession producing a fusion of the images. The attempts to build an instrument employing flicker fusion found the problems of alignment, balance and stability too great for the moving parts employed.

This invention solves the problem of simultaneously viewing two objects positioned along a common axis with a relatively simple and inexpensive means. Briefly, the invention comprises means for forming images of the first and second objects positioned in different object planes along on optical axis different magnifications and separated by a finite distance; and correction means for equalizing the magnification of the images and for superimposing one image on the other image.

Thus, an optical system has been invented which enables simultaneous optimum focusing of two objects with the same resultant magnification, wherein the objects are located upon two separate planes along a common axis. The planes upon which the objects are located are sufficiently separated so that in conjunction with the depth of focus of the lens employed, the interference between images will be minimal. A lens with an adequate aperture number is employed to resolve the extremely small devices. The invented optical system employs no moving parts and all alignment may be carried out with the objects remaining in a fixed position.

The invention has been described above with reference to the electrical art but it has application to virtually any type of objects. The advantages and details are described in the specification which follows with respect to particular embodiments. It is understood that these embodiments make reference to a particular environment and devices only for the purpose of explanation. The invented optical system may be employed in many other and different environments.

The drawings showing the invention include:

FIG. 1, which is an optical schematic diagram of a simple system; and

FIG. 2, which is an optical schematic diagram of a more detailed system.

The invention will first be briefly described by reference to FIG. 1 and the simple system shown therein. A more detailed explanation will follow with reference to another embodiment shown in FIG. 2. Referring to FIG. 1, ordinarily when viewing two object planes, M and W, located on the same optical axis but at different distances from the objective lens 20, real, inverted and much enlarged primary images will be formed on the other side of lens 20, namely, $M_p$ and $W_p$. The magnification and location from lens 20 is determined by the optical spacing of planes M and W from the front focal plane of lens 20; therefore, images $M_p$ and $W_p$ will be of different size and at different locations. Broadly, this invention provides the means by which images of both object planes M and W will appear on a common plane and at the same magnification.

By focusing the light rays from planes M and W, with lens 20 through a simple beam divider cube means 32, two alternate light paths are created by the diagonal interface 34. The first of these alternate paths (receives either the reflected or transmitted portion of the light rays) contains a plane mirror face 39 normal to the optical axis 70 which returns the rays to interface 34 where they will again be equally reflected and transmitted. From plane mirror face 39, one of the light paths will return to objective lens 20, while the other path will exit the beam splitter cube and form primary images $M_p$ and $W_p$, differing in both size and location.

The second alternate path, like the first, has its beginning at interface 34. However, the distance to, as well as the shape of a reflecting face, lensed mirror face 48, has been altered so that both length and attitude of the constituent rays will form images $M_p'$ and $W_p'$. These altered rays will impinge upon interface 34 and, like the rays following the first alterante path, will be equally divided with half returning to lens 20, while the rest follow the same exit path from the beam splitter. The images $M_p'$ and $W_p'$ will be formed with either $W_p$ and $MM_p'$ or $W_p'$ and $M_p$ having a common plane and equal magnification.

In essence, $M_p$ and $W_p$ are real images formed by the virtual images $M_v$ and $W_v$ located behind plane mirrored face 39 of the first alternate path, while images $M_p'$ and $W_p'$ are real images of the virtual images $M_v'$ and $W_v'$ located behind lensed mirror face 48 of the second alternate route. In this way, two primary images differing in size and distance from both M and W, namely, $M_p$, $M_p'$, $W_p$, $W_p'$, are formed with one of both images of M and W being identical in location and size. Thus, the simultaneous viewing of two separate object planes located along a single optical axis is accomplished.

In order to accommodate a more practical configuration for our present needs, a slightly different arrangement of components and subsequent order of events was devised. In this system, shown in FIG. 2, the primary images $M_p$ and $W_p$ are allowed to form along the optical axis behind lens 20 as in any conventional system, thus providing different locations and sizes. However, just beyond the focal planes of these primary images a beam divider cube 32 is located. At diagonal interface 34, two alternate light paths are created with virtual images of $M_p$ and $W_p$, namely $M_v$ and $W_v$, lying behind the plane mirror face 39 of one alternate path and $M_v'$ and $W_v'$ lying behind the lensed mirror face 48 of the other alternate path, differing in length, too. A relay lens means 60 located just beyond the exit face of the beam divider cube will now be able to focus upon $M_v$ and $W_v'$ or $M_v'$ and $W_v$ at the same distance and magnification, due to the alteration of relay lens means 60's front conjugate by the two differing alternate light paths. As far as relay lens means 60 is concerned, $M_v$ and $W_v'$ or $M_v'$ and $W_v$ are the same size and distance. Therefore, the rear conjugate of relay lens means 60 will focus a pair of images of $M_v$ and $W_v'$ or $M_v'$ and $W_v$ on a common plane and magnification, there to be viewed by the eye with the aid of an eye piece or by other means.

Referring more specifically to FIG. 2, optical system 10 comprises objective means 20, correction means 30, relay means 60 and ocular means 72, located along common optical axis 70. A first object 21 and a second object 22 are located in succession adjacent objective means 20 and along axis 70. Typically, the surfaces M and W are separated by a distance in the order of 0.05 millimeter. The first object 21 is preferably a member which is in part transparent and in part opaque to form a pattern such as the masks employed in the semiconductor fabrication art. The object 22 is preferably a solid-state wafer such as a semiconductor wafer of monocrystalline silicon having devices therein with certain dimensions in the order of 1 micron (e.g., 1–50 microns). The devices formed in wafer 22 extend to surface W and are separated with wafer 22 so that the patterns on these members may be compared with the aid of optical system 10.

The objective means 20 may be a suitable objective such as commonly employed in microscope, e.g., an objective having a focal length of 9.724 millimeters, and corrected for the glass mask's thickness. The objective means 20 typically forms a real, inverted and much enlarged image of the object and includes a lens system which has one focal point coincident with the object to be viewed and another focal point removed therefrom. A typical lens system is composed of several positive lenses, the first of which is hemispherical with its plane surface facing the object. Following this is a larger concavo-convex or meniscus lens and then two larger plano-convex achromatic lenses. In a typical lens system, lens system 20 would be separated from surface M by a distance such as 10.16 millimeters and would be separated from surface W by a distance of 10.21 millimeters. The viewing of the surface W of wafer 22 by the lens system would result in a first image $W_p$ and a second image $M_p$ spaced a substantial distance image $W_p$. These images would have different magnifications relative to their different conjugates, that is, the distance from the objective lens system to image $W_p$ would be different than the distance to image $M_p$. The differences in magnification and conjugates makes it impossible to view and compare images $W_p$ and $M_p$ by employing the usual optics associated with microscopes.

To solve the problem, correction means 30 is included for equalizing the magnification of images $M_p$ and $W_p$ and for superimposing one image on the other (i.e., equalizing the conjugates associated with such images). To accomplish this, correction means 30 includes a beam divider cube means 32 having a diagonal interface 34 which is in part transparent and in part reflective (e.g., 50 percent reflective and 50 percent transparent). Diagonal interface 34 divides the cube means 32 into a front portion 36 and a back or rear portion 38 which is behind interface 34. The back portion 38 is bounded by a plane mirror face 39. The other surfaces of cube 32 are transparent so that radiant energy may enter surface 40 and pass from cube 32 via surfaces 42 or 44. Adjacent surface 44 is the other element of correction means 30 which is a lens 46 having a lensed mirror face 48 which is separated from surface 44 of cube 32 by a distance 41. The optical axis 70 intersects the diagonal surface 34 at a reference point 53. With respect to this reference point, the plane mirror face 39, which may be referred to as the first reflecting surface, is a first predetermined distance therefrom while the lensed mirror face 48, which may be referred to as the second reflecting surface, is a second and different predetermined distance from this reference point. In this embodiment, the predetermined distance from lensed mirror face 48 to reference point 53 is greater than the distance from plane mirror face 39 to this point.

The light rays transmitted by objective lens 20 are directed to the correction means 30 by a folding means, such as a penta-prism 49. The penta-prism has a pair of reflecting surfaces 51 and 52 which the light rays strike in succession and direct to correction means 30. The purpose of the penta-prism is to enable the light rays to enter the cube 32 in proper relation thereto. It is possible to eliminate the penta-prism by passing the light rays directly from objective lens 20 to cube 32.

The light rays impinging upon diagonal surface 34 take two meaningful paths (and other unimportant paths). First, part of the radiant energy passes through diagonal surface 34, strikes plane mirror face 39, is returned to diagonal surface 34, and is reflected to relay means 60. The other meaningful path results from the radiant energy impinging upon diagonal surface 34 and being reflected downwardly to lensed mirror face 48 and returned therefrom to relay means 60 via diagonal surface 34 of cube 32. Other paths which the radiant energy follows in the optical system because of the selectivity of the lens system to images at various positions at worst result in only a slight loss of contrast of the formed images. It should be noted that of the two meaningful paths the one via lensed mirror face 48 is substantially longer than that via plane mirror face 39. The difference in length of the optical path via reflecting lens surface 48, that is, in this embodiment the greater length of the optical path via lens surface 48, along with the curvature of reflecting lens surface 48, enables the difference in conjugates and magnification to be corrected and equalized. It should be recognized that mirror face 39 need not be formed on cube 32 but could be separated therefrom. It is also possible by properly designing lens surface 48 to make the distance thereto shorter than to mirror face 39.

The relay means 60 functions to provide a given magnification (e.g, 2×) and to focus the images at an appropriate point along optical axis 70 so that the ocular means 72 may transmit the image to the eye 74 of a viewer. The relay means 60 comprises a pair of lens 62 and 64 designed to form a symmetrical lens. The lens 62 acts upon the radiant energy to make it appear to come from infinity while lens 64 focuses this image at the particular point required by ocular means 72. Relay means, such as the double-gauss holo-symmetrical system, may be employed as well as other known relay means.

The ocular means or eye piece 72 functions to form a virtual image at the eye 74 so that the objects, which in this embodiment are mask 21 and wafer 22, may be viewed. The ocular means is placed beyond relay means 60, with its focal plane coincident with the image formed by relay means 60, and it acts as a collimator so that one looking into it sees a virtual image apparently at an infinite distance and subtending a wide angle. Such ocular means are well known in the art.

A typical example of the objects and components that may be employed in the system described above are as follows:

| Element | Specification |
|---|---|
| Mask 21 | A 1.5 mm. thick glass plate with either an opaque or clear photographic image on one surface. |
| Wafer 23 | A semiconductor substrate that has been coated with a photoresist. |
| Objective means 20 | #42-33-54 B & L objective lens corrected for use with 1.5 mm. cover glass (9.724 mm. F.L.) |
| Penta-prism 49 | Rolyn Corp. FD/P-26-1 15 x 5 mm. penta-prism. |
| Beam divider cube 32 | Neutral beam divider cube B & L #31-19-59-070 having a mirror formed on one surface. |
| Reflecting lens 46 | (−320 mm. F.L.) Lens with mirrored surface. |
| Relay lens 62 | Rolyn Corp. 68 mm. F.L. x 29 mm. diameter achromat. |
| Relay lens 64 | B & L 131.4 mm. F.L. x 31.2 mm. diameter achromat. |
| Ocular means 72 | Suitable commercially available eye piece (e.g., 10X wide field lens). |

In summary, objects 21 and 22 are placed on a common axis 70 at digerent positions thereon. The objective means 20 views these objects and transmits images of these objects with different conjugates and different magnifications. The correction means 30 splits the radiant energy into two meaningful paths, whereby the difference in magnification and conjugate distance is corrected by making one of the paths longer and by including a lens in this longer path. The corrected images are transmitted to ocular means 72 by relay means 60. At ocular means 72 the images of objects 21 and 22 are viewed by eye 74.

This optical system, which may be employed as a microscope, has the advantages of being able to simultaneously view very small devices located along a common axis and separated without employing any moving parts, low numerical aperture objectives, or other undue complications. In addition, the objects are viewed with the same magnification, without sacrifice in focusing and without endangering the parts being viewed.

What is claimed is:

1. A microscope for simultaneously forming in one image plane equally magnified real images of two different objects in two different object planes, said object planes being perpendicular to the optical axis of said microscope, said microscope comprising;

objective means for forming real images of said two objects, said real images having different magnifications and being separated by a finite distance; ocular means for focusing selected images of said two objects on a selected image plane; and corrections means, located between said objective means and said ocular means including at least two spaced optically aligned reflecting surfaces for equalizing the magnification of said images and for superimposing said equally magnified images.

2. The structure recited in claim 1, including relay means for focusing said superimposed images for viewing by said ocular means, whereby a human may simultaneously view two objects that lie along an optical axis.

3. The structure recited in claim 1, wherein said correction means comprises a beam divider means for simultaneously passing part of the radiant energy from said two objects to a first mirrored surface located at a first predetermined distance from a reference point and for passing the remaining radiant energy from said objects to a second mirrored surface at a second predetermined distance from said reference point, said first and second predetermined distances selected to compensate for the different positions of said first and second objects along said optical axis.

4. The structure recited in claim 3, wherein said first mirrored surface is flat, and wherein said second mirrored surface is convex, thereby to produce in one image plane two equally-magnified images of said two objects.

5. The structure recited in claim 5, wherein said predetermined distances are different in magnitude.

6. The structure recited in claim 1, wherein said correction means comprises:

a beam divider cube means having a slanted surface that is partially transparent and partially reflecting, said surface making a 45° angle to said optical axis, said cube means having a first reflecting plane surface disposed behind said slanted surface to receive the radiant energy transmitted through said slanted surface and to reflect said transmitted radiant energy back to said slanted surface for reflection thereby of at least a portion of said transmitted radiant energy; and a reflecting convex surface located to receive the radiant energy directly reflected by said slanted surface and to return said directly reflected radiant energy to said slanted surface, at least a portion of said directly reflected radiant energy returned by said reflecting convex surface passing through said slanted surface, said reflecting convex surface being positioned a greater distance from said slanted surface than said plane mirrored surface.

References Cited

UNITED STATES PATENTS

| | | | |
|---|---|---|---|
| 3,068,743 | 12/1962 | Dyson | 350—173 |
| 2,838,889 | 6/1958 | Lankes | 51—165.40 |
| 2,845,756 | 8/1958 | Papke. | |

PAUL R. GILLIAM, Primary Examiner

U.S. Cl. X.R.

350—30, 33, 50, 173, 174

UNITED STATES PATENT OFFICE
CERTIFICATE OF CORRECTION

Patent No. 3,488,104 Dates January 6, 1970

J. J. Doherty

It is certified that error appears in the above-identified patent and that said Letters Patent are hereby corrected as shown below:

Column 1, line 26, "Tread" should read --trend--; line 70, "is" should read --in--. Column 2, line 8, between "axis" and "different" add --the images having--. Column 3, line 1, "alterante" should read --alternate--; line 5, "$MM_p'$" should read --$M_p'$--; line 57, after "separated" add --from surface M of mask 21. The mask 21 is aligned--.

Claim 5, line 1, after "claim" cancel "5" and substitute --3--.

SIGNED AND
SEALED
JUL 14 1970

(SEAL)
Attest:

Edward M. Fletcher, Jr.
Attesting Officer

WILLIAM E. SCHUYLER, JR.
Commissioner of Patents